(12) United States Patent
Barczyk et al.

(10) Patent No.: US 7,703,687 B2
(45) Date of Patent: Apr. 27, 2010

(54) LABEL

(75) Inventors: Victor S. Barczyk, Lone Tree, CO (US); Otsuka Masanori, Tokyo (JP); Stefan Schwiers, Dubai (AE); Kumabayashi Tomoyuki, Tokyo (JP); Klaus Horn, Wuppertal (DE)

(73) Assignee: Kabushiki Kaisha Sato (JP)

( * ) Notice: Subject to any disclaimer, the term of this patent is extended or adjusted under 35 U.S.C. 154(b) by 852 days.

(21) Appl. No.: 10/579,505

(22) PCT Filed: Sep. 28, 2005

(86) PCT No.: PCT/EP2005/010497

§ 371 (c)(1),
(2), (4) Date: Oct. 27, 2006

(87) PCT Pub. No.: WO2006/045395

PCT Pub. Date: May 4, 2006

(65) Prior Publication Data

US 2007/0145150 A1   Jun. 28, 2007

(30) Foreign Application Priority Data

Oct. 22, 2004 (EP) .................... 04077912
Mar. 30, 2005 (JP) .................... 2005-098062

(51) Int. Cl.
*G06K 19/06* (2006.01)

(52) U.S. Cl. .............. 235/492; 235/462.13; 235/486; 235/489; 235/495; 235/380; 340/572.1; 340/572.8; 340/572.9

(58) Field of Classification Search ............ 235/380, 235/492, 495, 489, 486, 462.13; 340/572.1, 340/572.8, 572.9
See application file for complete search history.

(56) References Cited

U.S. PATENT DOCUMENTS

| | | | | |
|---|---|---|---|---|
| 5,838,253 A | * | 11/1998 | Wurz et al. | 340/10.42 |
| 6,278,413 B1 | * | 8/2001 | Hugh et al. | 343/818 |
| 6,373,387 B1 | * | 4/2002 | Qiu et al. | 340/572.1 |
| 6,724,311 B1 | * | 4/2004 | Kolton et al. | 340/572.8 |
| 6,836,215 B1 | * | 12/2004 | Laurash et al. | 340/572.1 |
| 2002/0008632 A1 | | 1/2002 | Clothier | |
| 2002/0011967 A1 | | 1/2002 | Goff et al. | |
| 2006/0086808 A1 | * | 4/2006 | Appalucci et al. | 235/492 |

(Continued)

FOREIGN PATENT DOCUMENTS

DE    100 17 142 A1    10/2001

(Continued)

OTHER PUBLICATIONS

Requisition dated Jan. 22, 2009 in corresponding Canadian Application No. 2,548,453.

(Continued)

*Primary Examiner*—Michael G Lee
*Assistant Examiner*—Kristy A Haupt
(74) *Attorney, Agent, or Firm*—Ostrolenk Faber LLP

(57) ABSTRACT

The present invention refers to a label comprising a pasting part for pasting said label to an object and comprising an electronic device preferably for a radio frequency identification (RFID). In order to improve such a label, it is suggested that the electronic device is pivotably connected to said pasting part.

41 Claims, 10 Drawing Sheets

U.S. PATENT DOCUMENTS

2006/0092027 A1* 5/2006 Ito .................. 340/572.7
2006/0113397 A1* 6/2006 Beilenhoff et al. ......... 235/494
2007/0034692 A1* 2/2007 Johnson .................. 235/383

FOREIGN PATENT DOCUMENTS

| DE | 10017142 | 10/2001 |
|---|---|---|
| DE | 20 2004 003 107 | 5/2004 |
| JP | 2002-216086 | 8/2002 |
| JP | 2004-272344 | 9/2004 |
| KR | 1020070083606 | 8/2007 |
| WO | WO 00/54216 | 9/2000 |
| WO | WO/01/78002 | 10/2001 |
| WO | WO 2004/025554 | 3/2004 |
| WO | 2006/027409 | 3/2006 |
| WO | WO 2006/027409 | 3/2006 |

OTHER PUBLICATIONS

International Preliminary Report on Patentability in corresponding International Application No. PCT/EP2005/010497.

International Search Report PCT/EP2005/010497 dated Dec. 5, 2005.

* cited by examiner

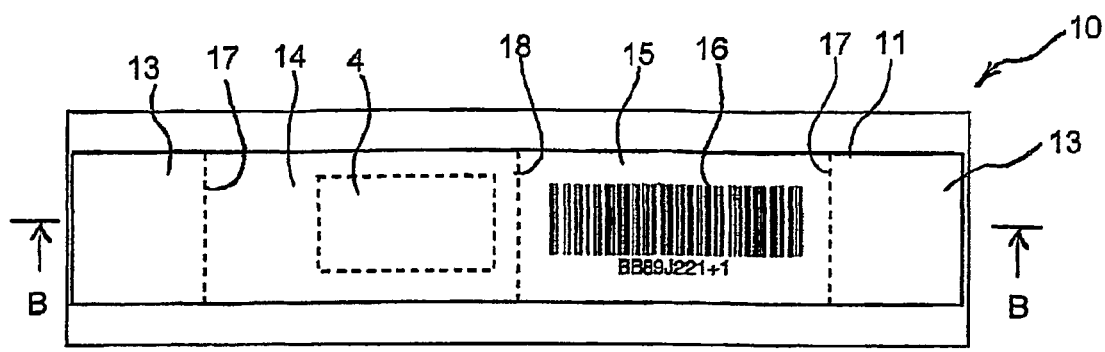
Fig.1A
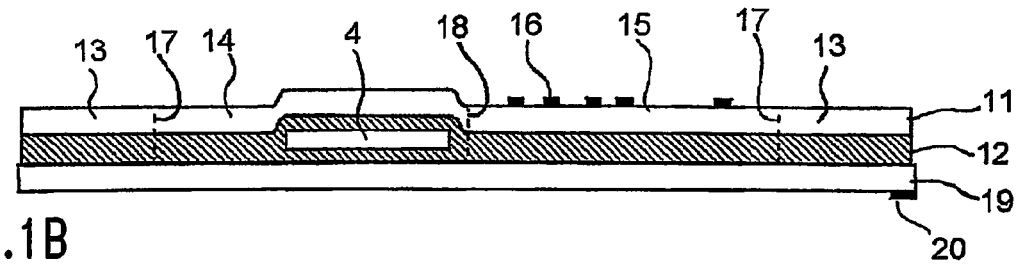
Fig.1B
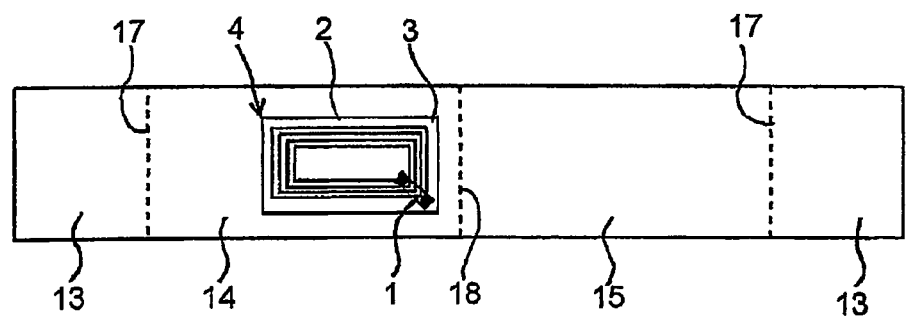
Fig.1C
Fig.2

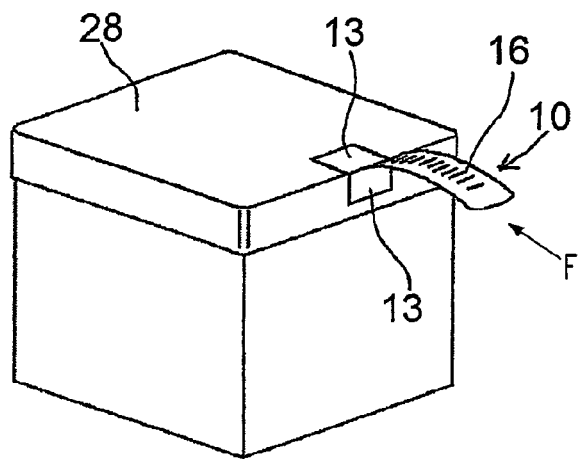
Fig.9
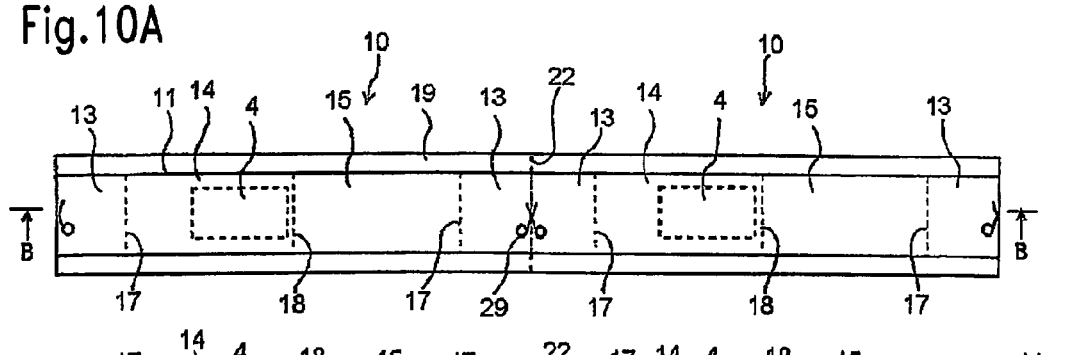
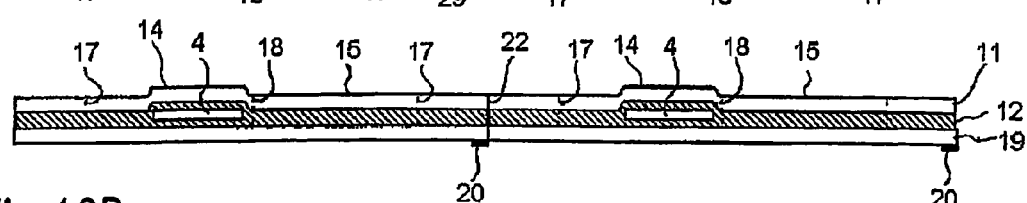
Fig.10A
Fig.10B

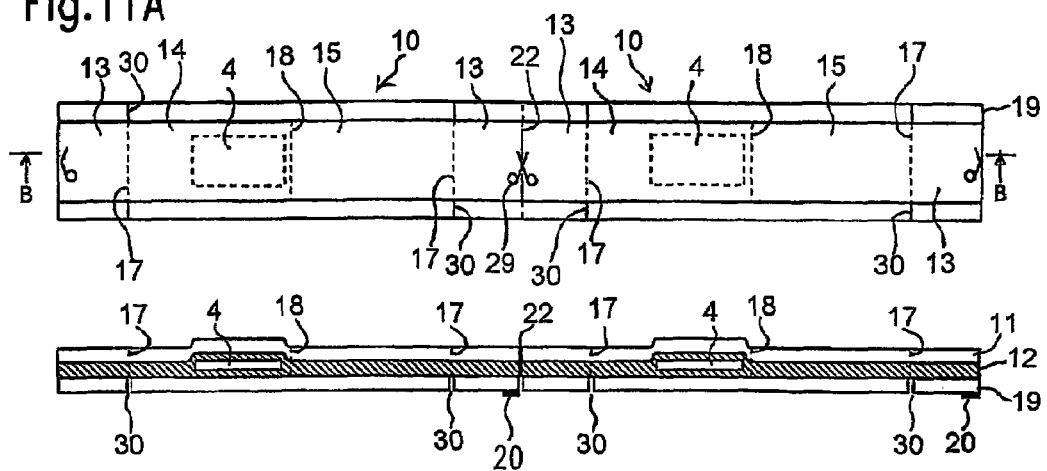
Fig.11A
Fig.11B
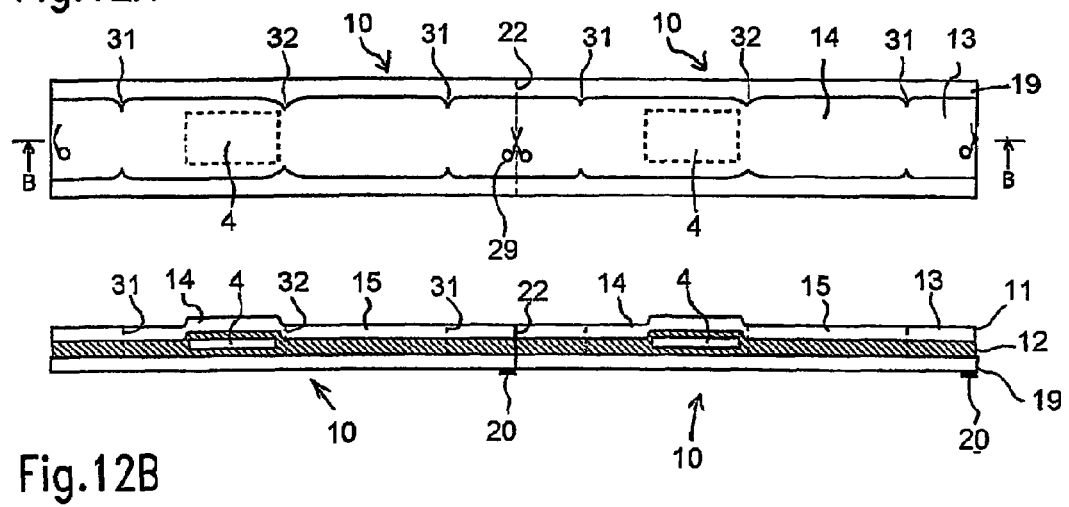
Fig.12A
Fig.12B

LABEL

CROSS REFERENCE TO RELATED APPLICATIONS

The present application is a 35 U.S.C. §371 National Phase conversion of PCT/EP2005/010497 filed Sep. 28, 2005, which claims priority of European Patent Application No. 04077912.6 filed Oct. 22, 2004 and claims priority of Japanese Patent Application No. 2005-098062 filed Mar. 30, 2005. The PCT International Application was published in the English language.

BACKGROUND OF THE INVENTION

The present invention relates to a label comprising at least one pasting part comprising an adhesive agent for pasting the label to an object and comprising a holding part for holding an electronic device, preferably for radio frequency identification (RFID) and to a method for applying such a label to an object, as well as an object with a label and a device for applying the label to an object.

Such labels are commonly known in the art. The electronic device is usually referred to as a RFID tag which comprises an antenna which is connected to an integrated circuit including a receiver and a transmitter. Due to the integrated circuit, these are also referred to as IC tags. Of course, the electronic device can comprise different components and is not necessarily limited to a specific RFID tag.

Labels comprising a RFID tag are used for example for tracing, recognising and identifying different objects such as beverages, blister packs, cartons, pallets, etc. Generally, a label comprising a RFID tag is usually referred to as a "smart" RFID label.

It should be noted that it is also known to use RFID tags as theft prevention on goods, in particular valuable goods such as clothing, bottles of whiskey, etc. However, these latter RFID tags are generally not connected to a memory provided for storing data related to the object, since the tag is generally only calibrated to a particular resonant frequency, provided to react and trigger an alarm signal when the object with the tag passes a gate where the resonant frequency is detected.

In recent years, there has been active development of RFID (radio frequency ID), which is a technique that uses wireless communications to perform reading and writing on IC chips.

The operating principle of this technique will be described with reference to FIG. 21.

In the RFID 5, an IC tag 4 (called an inlet or inlay) consisting of a thin film 3 containing an IC chip 1 and an antenna 2 is worked into a label, plastic card or suspended tag; this is used by being pasted to or suspended from the object that is being controlled.

A coil form antenna 2 is connected to the IC chip 1 that forms the essential part of the IC tag 4; when electromagnetic waves from a reader-writer 6 strike this antenna, a current is generated, and the IC chip 1 is driven using this current, so that data transmitted from the reader-writer 6 is received, and information stored in the memory of the IC chip 1 itself is transmitted by wireless transmission.

A memory is contained in the IC chip 1; this memory ordinarily includes a system region that cannot be rewritten, and a user data region that can be rewritten (some chips do not have a region that can be rewritten).

Since the information contained in the system region is invariable, this information cannot be falsified or copied, and is therefore superior in terms of security. Various frequencies are used in RFID, such as long wave at several hundred kilohertz, short wave at several tens of megahertz, UHF at several hundred megahertz, microwave at several gigahertz and the like. This also varies slightly according to the country involved. Characteristics such as communications distance, directionality, communications rate, noise, electromagnetic interference and the like vary according to the frequency used, so that it is necessary to select this frequency in accordance with the object of utilization and the surrounding environment.

Furthermore, though this also varies according to the frequency, electromagnetic waves are absorbed by metals and water especially in RFID in the UHF band; accordingly, if metals or water are present in the vicinity of the reader or IC tag, there may be instances in which information of the IC tag cannot be read or written.

In order to solve this problem, it is necessary to remove the offending object, or to utilize a special IC tag and frequency that are unaffected.

There are also other situations where the performance of the label is not sufficient. Depending on the composition or shape of the object on which the tag or label is affixed, the performance of the tag can be greatly impeded due to the nature of RFID and the laws of physics. In these cases, human intervention is generally required either for orienting the object or manually entering the data of the tag into a computer system, which would normally have been transmitted from the RFID tag. This human intervention increases the costs and chances of error, and slows down the whole identifying operation.

It is, therefore, an object of the present invention to provide an RFID tag carrying label, which enables an enhanced performance when data processing with the tag is requested, in particular reading or writing over greater distances. It is furthermore an object of the present invention to allow to attach the label to an object so that the label is separated from the object by a specific distance, thus preventing a shortening of the communication distance by absorption or reflection of electromagnetic waves due to the effects of the material of contents (metal, moisture or the like) of the container or the like that constitutes the object.

SUMMARY OF THE INVENTION

The object of the present invention is solved by a label of the aforementioned kind wherein said pasting part being foldable with respect to the holding part to allow said holding part to protrude from said object if said pasting part is pasted to said object.

This solution is simple and allows on the one hand to attach rigidly the label to the object through the pasting part, and on the other hand to pivotably move the electronic device or tag manually by an operator depending on the orientation of the object or the orientation of the reader for reading the electronic data from the RFID tag. The operator may move the tag until reception by the reader is improved, thus avoiding manually entering of the data into a computer system. This fact is particularly advantageous in relation to rather large objects such as boxes or containers. It may also be possible to completely avoid human intervention and to adjust the label with respect to the orientation of a reading device depending on the shape of the object. It may be possible that a mechanical device pivotably moves the tag with respect to the pasting part, thereby orientating the tag with respect to a reading device. Also, as the electronic device or tag is allowed to protrude relatively to the pasting part and thus, relatively to the object, it is also possible to avoid interference of the materials contained in the container or the materials of the container.

In a preferred embodiment, said holding part is pivotably connected to said pasting part. This allows a simple and repeated movement of the holding part with respect to the pasting part, thus allowing to easily adjust the holding part with respect to the location of a reader for reading the electronic data from the RFID tag.

It is also advantageous if the holding part comprises an adhesive layer comprising an adhesive agent for attaching said electronic device to the label, thereby allowing a very simple way of securely attaching the electronic device to the label.

In order to improve the connection between the label and the object, said label may comprise a second pasting part and said holding part may be arranged between the first and the second pasting part. Thus, the holding part can be attached to the object through two pasting parts.

It is also advantageous if said label comprises a stroke part between the holding part and the first or second pasting part. Such an additional stroke part may be used to cover the adhesive layer of the holding part. It might particularly be of advantage if the stroke part forms a printing recording part.

In a preferred embodiment of the invention, the stroke part is foldable over the holding part and electronic device, such that the electronic device is located between the holding part and the stroke part and in order to form a flap which is pivotably connected to said first and second pasting parts. Such an embodiment provides an essentially T-shaped label which can be attached to the object. The flap extends essentially perpendicular to the pasting parts.

It may also be advantageous if the dimension of the stroke part corresponds essentially to the dimension of the holding part. Thus, it can be avoided that an operator comes into contact with the adhesive layer after the label has been folded over.

The label becomes very compact and is sturdy, if the first and second pasting parts are arranged adjacent to each other when pasting the label to the object. In this configuration, the label is essentially T-shaped.

In order to fully cover the electronic device, the dimension of the electronic device is smaller than the holding part.

In a preferred embodiment of the invention, the label may comprise at least a folding line between the stroke part and the holding part and/or the holding part and the pasting part. It can be preferred if the folding line is printed onto the label. Thereby, it is easy for a person to recognise the folding line, thus avoiding mishandling of the label.

In another embodiment, the folding line may be formed by perforations or at least one slit. Such a folding line also enhances folding of the label and defines a very exact folding line.

In an alternative embodiment of the invention, the folding line may be a reduced cross-section of the label. Such an embodiment also allows a very accurate folding line.

In a further embodiment, the folding line may be formed by a reduced width of the label. A reduced width of the label also may clearly indicate the folding line, thus also avoiding mishandling of the label.

This allows a very simple way for a pivotable connection of the electronic device or tag to the connecting section. The flap forms a freely extending protrusion with respect to the volume of the object to which the label is attached. The fact that the tag or flap is off-set from the volume enclosed by the object and forms a freely extending protrusion, operation using the label according to the invention becomes very easy as instead of moving the object itself, it is merely necessary to pivotably move the flap. The use of a self-adhesive layer for the pasting part enables a fast and reliable application of the label.

In a preferred embodiment of the invention, the dimensions of the stroke part correspond essentially to the dimension of the holding part. Thus, using the self-adhesive layer for the holding part, it is possible that the holding part is fully covered by the stroke part, thus avoiding to expose adhesive sections of the holding part to the user after folding the stroke part towards the part.

In order to provide a reliable and easy connection between the stroke part and the holding part, the dimensions of the electronic device are smaller than the holding part. It is thus possible to allow a frame of adhesive around the electronic device, thus securing a reliable connection between the holding part and the stroke part.

It may further be advantageous if the holding part is located between the stroke part and the pasting part. This may particularly improve handling of the label while manually attaching the label. With such an arrangement, the stroke part may be the outermost side of the label prior to folding which can easily be folded towards the holding section.

In a further preferred embodiment of the invention, the adhesive layer of the pasting or stroke section is unitarily formed with the adhesive layer of the holding part. This allows a very simple manufacturing of the label, particularly for an arrangement where the holding part is located next to the pasting part.

In order to further improve the connection between the holding part and the stroke part after folding the stroke part on the holding part, the stroke part may also comprise an adhesive layer. It may thereby be advantageous if the adhesive layer of the stroke part is unitarily formed with the adhesive layer of the pasting part or the holding part. This also simplifies production of the label.

In a preferred embodiment of the invention, the length of the holding part may be smaller than the length of the pasting part. With such an arrangement, a good attachment of the label to the object can be secured, as the pasting part is rather larger compared to the holding part. Also, the length of the pasting part may be at least three times the length of the holding part. Such a ratio has proven to be advantageous in order to have a good visibility and secure attachment of the label. In this respect, it has to be noted that the length of the label is defined in a way such that the pasting parts, the holding part and the stroke part are arranged along the length of the label. The width of all the parts is the same.

In a further embodiment, it might be advantageous if the length of the second pasting part is smaller than the length of the first pasting part. Such an arrangement allows easy handling on the one hand and secure attachment of the label to the object on the other hand. The dimensions of the second pasting part may correspond essentially to the dimensions of the holding part or the stroke part. This also allows a good compromise between handling of the label and a secure attachment of the label to the object.

Furthermore, it is advisable if the length of the pasting part is larger than the width of the pasting part. This allows a good compromise between handling the label and a secure attachment of the label to the object. Preferably, the length is about three times the width of the pasting section.

In a preferred embodiment of the invention, a backing layer may be provided to the adhesive layer of the label. Such a backing layer comprising preferably a peeling paper allows improved handling of the label when attaching it to the object. Thus, an operator may remove the peeling paper prior to applying the label to the object. In an improved embodiment, the backing layer may be provided with perforations or slits along the folding line, either coinciding with or in the vicinity of the folding line or bent part of the label or label substrate.

In another embodiment of the invention, the backing layer may be comprised of at least two backing layer sections, of which one corresponds to the holding part. This allows to selectively remove the backing layer sections. Such an arrangement allows further to first remove the backing layer for the pasting section and then attach the label to the object. In a subsequent step, it is possible then to remove the second or additional backing layers in order to fold-over the stroke part and the holding part. Finally, if provided, it is then possible to attach the second pasting part to the object.

It is generally preferable if the label may comprise a flexible material, preferably paper. Labels or the label substrate from paper provide sufficient flexibility on the one hand and are simple to manufacture. It is also easy to provide them with an adhesive layer.

In an alternative embodiment, the label may comprise a flexible textile material. Such labels provide great strength by sufficient flexibility.

In another alternative embodiment of the invention, the label may comprise a flexible plastic material, preferably polypropylene, polyethylene or other thermoplastic materials. Such plastic materials are easy to manufacture and allow great strength by sufficient flexibility. It is also possible to provide translucent labels. Generally, it is also possible to provide the labels made of several layers of material including adhesive layer. The material of the label aside from the adhesive layer may be comprised of multiple layers of materials. It is, however, advantageous for manufacturing if at least the pasting part and the holding part are made from the same material.

For the appearance of the label and the possibility to use the pasting part as a display area, it may be advantageous if at least the pasting part is opaque. It is also advantageous if the width of the stroke or holding part is at least ten times its thickness. This allows sufficient flexibility in order to fold-over the stroke and holding sections.

In a preferred embodiment of invention, the holding part is separably connected to the printing part. This allows for security reasons to separate the holding part from the pasting part, for example after the object has been sold. In order to easily allow separation from the holding part from the pasting part, the holding part may be separably connected to the pasting part by the folding line. As mentioned before, the folding line may comprise of perforations which specifically allow separation of the holding part from the pasting part. The holding part can then be torn off the pasting part, after the label has been pasted to an object.

The invention further relates to an object provided with a label according to the invention, wherein the pasting part, preferably two pasting parts are attached to the object. With such objects, it is possible to achieve the advantages of the invention.

In order to be able to move the electronic device with respect to the pasting part or the pasting parts, it is advantageous if the stroke part and the holding part form a flap which is pivotably connected to the pasting part or the pasting parts.

Also, an advantageous embodiment of the invention may provide an object which is a flexible container.

Also, in an advantageous embodiment, the label may be attached to a corner of the object, such that the pasting parts are located to either sides of the corner. This way, the label straddles on the corner.

In an alternative embodiment, the object has an at least partially cylindrical section to which the label is attached. Such an object may be a bottle. It might thereby be advantageous if the label is attached to the neck portion of the bottle.

Furthermore, the invention refers to a method for applying a label according to the invention which is characterised by folding the pasting part with respect to the holding part and pasting the pasting part to the object, such that the holding part protrudes from the object. This allows in a very simple manner to provide an object with a label wherein the label is pivotably held with respect to the object and/or the holding part is protruding from the object. In a further advantageous embodiment of the method, folding the holding part and the stroke part towards each other before applying the label to the object, then applying the pasting part or the pasting parts to the object allows to create an essentially T-shaped label. Also, this sequence allows easy handling of the label when applying it to the object.

Similarly, handling of the label is improved by folding the holding part and the stroke part towards each other before applying the label to the object, then applying the pasting part or the pasting parts to the object.

In the abovementioned RFID label construction, the IC tag holding part and printing recording part of the label substrate are separate adjacent parts; accordingly, recording by printing using a printer can be performed without being hindered by the unevenness or thickness of the IC tag.

Furthermore, since pasting is performed so that the IC tag holding part rises from the surface of the object of pasting, the IC tag can securely receive electromagnetic waves without being affected by the material or contents of the object of pasting.

Moreover, if the abovementioned bent parts are formed by perforations formed in the label substrate or narrow-width parts formed by a partial narrow working of the width of the label substrate, then the bending locations are easy to ascertain, and the label substrate can easily be bent without any deviation, so that the bent parts can be pasted together.

Meanwhile, if the abovementioned bent parts are formed by printed bending lines on the label substrate or narrow-width parts formed by a partial narrow working of the width of the label substrate, the danger that the label substrate will be erroneously cut apart can be avoided.

Furthermore, if perforations or a slit is formed in the abovementioned peeling paper coinciding with or in the vicinity of at least one bent part of the label substrate, then the label substrate can be bent along easily bendable parts of the peeling paper, so that the danger of mistaking the position where the label substrate is bent and pasted together can be reduced.

Furthermore, in the pasting method of the present invention, by pasting or wrapping and pasting the label to the narrow neck part of a bottle filled with a liquid at a point above the liquid level in this bottle, it is possible to avoid interference by other bottles or RFID labels so that electromagnetic waves can be favourably received.

Furthermore, the same effects as those described above can also be obtained by pasting the label so that the respective pasting parts straddle the edge lines of a bag-shaped or box-shaped container.

EFFECTS OF THE INVENTION

In the present invention, recording by printing using a printer can be performed on the RFID label without any interference by the unevenness or thickness of the IC tag holding part.

Furthermore, the IC tag can securely receive electromagnetic waves without being affected by the material or contents of the object [of pasting]. Moreover, by constructing the bent parts by means of perforations formed in the label substrate or narrow-width parts formed by partial narrow working of the width of the label substrate, it is easily possible to ascertain the bending locations, so that the label substrate can easily be bent and pasted together without any deviation. Furthermore, if the bent parts are constructed by means of bending lines printed on the label substrate or narrow-width parts formed by partial narrow working of the width of the label substrate, the danger of cutting away the label substrate in an erroneous position can be avoided.

Furthermore, if perforations or a slit is formed in the peeling paper either coinciding with or in the vicinity of at least one bent part of the label substrate, the label substrate can be easily bent along the bending position of the peeling paper, so that the danger that the position where the label substrate is folded back and pasted together will be mistaken can be reduced; at the same time, the danger that the label substrate will be erroneously cut away can be avoided.

Furthermore, in the pasting method of the present invention, by pasting or wrapping and pasting the label to the slender neck part of a bottle filled with a liquid in a position above the liquid level in this bottle, it is possible to receive electromagnetic waves in a favourable manner without any interference from other bottles or RFID labels; a similar effect can also be obtained by pasting the label so that the respective pasting parts straddle the edge lines of a box-shaped container.

Furthermore, the invention refers to a device for applying a label according to the invention, which comprises a folding mechanism in order to fold the attachment section and the stroke section towards each other.

In a preferred embodiment of the device, it may comprise a supporting device for holding the label prior to folding it.

It is preferred that it comprises first pivotably movable supporting elements to which respectively abut the holding and stroke parts prior to folding.

It may also comprise at least the second supporting element which abuts the pasting part or parts.

The second supporting elements are in a preferred embodiment movable along the length of the stroke part whereas the first supporting elements are pivotably held.

In a preferred embodiment, the supporting elements may comprise supporting plates for abutment of the parting part and/or the holding part and/or the stroke part, respectively. With such supporting plates, a smooth surface is provided in order not to destroy the surface of the labels.

For improved handling of the labels, the supporting plates may comprise perforation through which a vacuum is applied in order to suck the label against the respective supporting plates.

In a further improved embodiment, in order to simplify the device the supporting elements may be connected through joints.

For improved handling of the label, the supporting plates are movable from a flat position in which their surfaces form essentially a plane for abutment of the label, into a second position, in which the surfaces of the first supporting plates are essentially facing each other.

BRIEF DESCRIPTION OF THE DRAWINGS

The invention will now be explained with reference to preferred embodiments of the invention which are depicted in the drawings.

FIG. 1 shows one unit of the RFID label of the present invention; FIG. 1(A) is a plan view, FIG. 1(B) is a sectional view along the direction of the arrow line B-B in FIG. 1(A), and FIG. 1(C) is a back view of the label substrate and IC tag.

FIG. 2 is a partially see-through external perspective view showing a state in which the RFID label shown in FIG. 1 is in an aggregate form (roll form product).

FIG. 9 is an explanatory diagram of a pasting method for the RFID label in cases where the object of pasting is a box-shaped container.

FIG. 10 is an explanatory diagram of an RFID label similar to that shown in FIGS. 1(A) and 1(B), showing a modification of the bent parts wherein FIG. 10A is a plan view and FIG. 10B is a sectional view along the line B-B.

FIG. 11 is an explanatory diagram of an RFID label similar to that shown in FIGS. 1(A) and 1(B), showing a modification of the bent parts wherein FIG. 11A is a plan view and FIG. 11B is a sectional view along the line B-B.

FIG. 12 is an explanatory diagram of an RFID label similar to that shown in FIGS. 1(A) and 1(B), showing a modification of the bent parts wherein FIG. 12A is a plan view and FIG. 12B is a sectional view along the line B-B.

FIG. 13 is an explanatory diagram of an RFID label similar to that shown in FIGS. 1(A) and 1(B), showing a modification of the bent parts wherein

DESCRIPTION OF A PREFERRED EMBODIMENT

Figure 3:
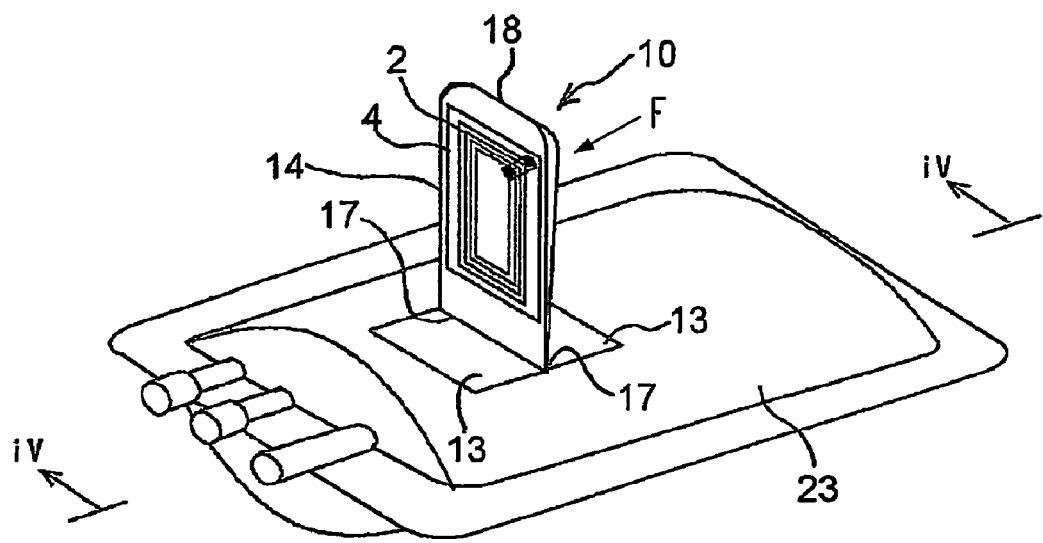
FIG. 3 is a partially see-through external perspective view showing the pasting method for the RFID shown in FIG. 1.

In FIG. 1, 10 indicates one unit of an RFID label according to an embodiment of the present invention. This RFID label 10 is constructed substantially from a strip-shaped label substrate 11 consisting of a single material or composite material such as a paper, plastic film, synthetic paper, non-woven fabric or the like, an adhesive agent 12 which is applied as a coating to the back surface of this label substrate 11, the abovementioned IC tag 4, and a peeling paper 19 whose surface is coated with a peeling agent such as silicone or the like.

In the above-mentioned label substrate 11, both ends in the direction of extension constitute pasting parts 13 that are pasted to the object of pasting, and the central part constitutes an IC tag or RFID tag holding part 14 on which the above-mentioned IC tag 4 is pasted and held, and an adjacent printing recording part 15. In the example shown in the figures, the back surface of the IC tag 14 is further coated with an adhesive agent 12; however, the adhesive agent on the back surface of this IC tag 4 may also be omitted.

Folding lines 17 and 18 consisting of perforations formed in the label substrate 11 are formed at the boundaries between the respective pasting parts 13 of the above-mentioned label substrate 11 and the IC tag holding part 14 and printing recording part 15. 16 indicates printed recording such as characters, symbols, graphics, a bar code or the like printed on the surface of the printing recording part 15. In a preferred embodiment, the bar code may comprise the same information as stored on the IC tag 14 in order to serve as a backup in case it is not possible to read the IC tag 14 of the RFID label. This also allows to use the label in areas where there is no reader for IC tag of the RFID labels. The bar code serves as an identification code.

The RFID label is printed by means of a printer; however, recording by means of handwriting or a stamp may also be used. Furthermore, this recording may be accomplished by ink coating, transfer or the like, or may be accomplished by self-colouring or engraving. Furthermore, in cases where self-colouring is used, it is necessary to install a structure such as a self-colouring layer or the like on the label substrate 11 beforehand.

19 indicates a peeling paper which is temporarily adhered to the adhesive agent 12 on the back surface of the above-mentioned label substrate 11 so as to protect the coating surface of the adhesive agent 12, and which is peeled away when the label is pasted to the object of pasting. A detection mark (eye mark) 20 is printed by means of black ink on one end of the above-mentioned peeling paper 19 in the direction of extension. This detection mark 20 is used as a mark for position detection by means of an optical sensor on the printer side when the RFID label 10 is printed using a printer.

From the production and circulation process to the setting in a printer and recording by printing, the RFID labels 10 are handled as a continuous roll-form product as shown in FIG. 2, and the peeling paper 19 is also used as a conveying carrier for the RFID labels inside the printer. A cutting line (perforation line) 22 that is used to cut the RFID labels 10 into individual labels is formed before or after (after in the example shown in the figures) each detection mark 20 on the above-mentioned peeling paper 19 (furthermore, the IC tags 4 in FIG. 2 are covered by the label substrate and cannot be seen; however, these are shown in a see-through view).

The RFID labels 10 are formed as described above; next, the method of use (pasting) of the RFID labels will be described. First, the RFID labels 10 on which recording has been performed on the printing recording part 15 (recording using a reader-writer for the IC tag 4 as well if necessary) using a printer or the like are cut into single units at the cutting lines 22, and the peeling paper 19 is removed.

Figure 4:
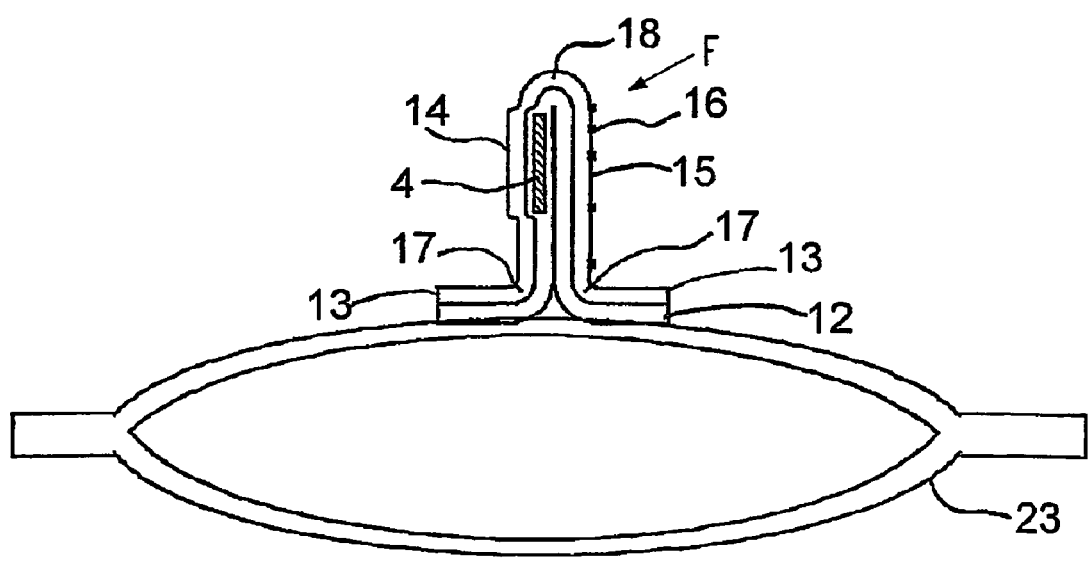
FIG. 4 is a sectional view along the direction of the arrow line IV-IV in FIG. 3.

Next, the respective pasting parts 13 are folded back on the surface side of the label substrate 11 at the bent part or folding line 17, and the IC tag holding part 14 and printing recording part 15 are bent at the bent part or folding line 18 and pasted together facing each other, thus forming substantially a flap F resulting in a T shape in which the respective pasting parts 13 are unfolded as shown in FIGS. 3 and 4, and the label is pasted so that the IC tag holding part 14 forms a flap and rises from the surface of the object of pasting (i. e., a blood bag 23, described later).

In the blood bag 23 used as the object of pasting in the embodiment, the contents consist of blood which has a large moisture content; accordingly, if the RFID label 10 is simply pasted in a flat planar configuration, electromagnetic waves will be absorbed by the blood bag 23, so that communications between the IC tag 4 and the reader-writer cannot be accomplished. Furthermore, since the blood bag 23 is an easily deformable bag-shaped container, the following drawback is also encountered: namely, in cases where the RFID label is simply pasted in a flat planar configuration, the antenna 2 and the like of the IC tag 4 tend to be cut off. Furthermore, in the case of blood, in addition to information that is determined at the time of collection such as the collection date, name of the donor, blood type, state of health, health history and the like, additional information such as the storage history and the like is also required; accordingly, control is difficult using an ordinary bar code label that does not allow additional recording or alteration.

Furthermore, in the present embodiment, since the IC tag holding part 14 and printing recording part 15 of the RFID label 10 are formed in different adjacent parts of the label substrate 10, the printing of a bar code 16 or the like by means of a printer can be performed without being hindered by the irregularity or thickness of the IC tag 4. Furthermore, since the label is pasted so that the IC tag holding part 14 rises from the surface of the blood bag 23 constituting the object of pasting, the IC tag 4 can securely receive electromagnetic waves without being affected by the material or contents of the blood bag 23, so that additional information or altered information can be added to the blood bag 23.

Furthermore, since the folding lines or bent parts 17 and 18 of the label substrate 11 are formed by perforations that are formed in the label substrate 11, the locations 11 where the label substrate 11 is to be bent can easily be ascertained, so that these parts can be pasted together without any deviation.

Furthermore, in spite of the fact that the blood bag 23 is easily deformable, the following advantage is also obtained: namely, since the RFID holding part 14 is reinforced by folding the label substrate 11 double and pasting [these folded parts] together, the antenna 2 and the like of the IC tag 4 cannot easily be cut off.

Figure 5:
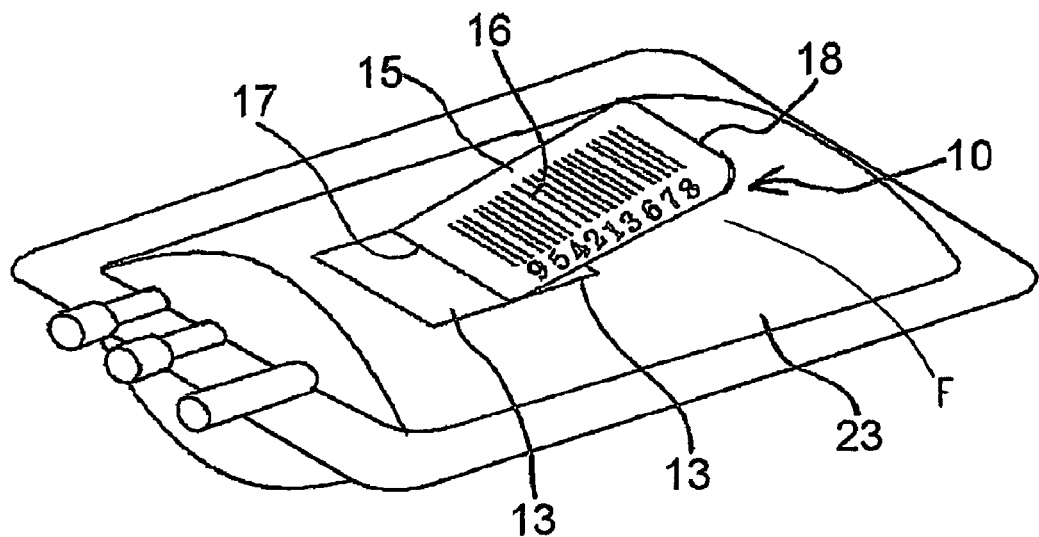
FIG. 5 is an explanatory diagram showing how the RFID label in FIG. 3 is bent so as to lie on its side.

Furthermore, in case where the bar code 16 of the RFID label 10 is read by a touch scan or pen scan, the RFID label 10 can be bent or folded at the bent part 17 so that the label is caused to lie on its side as shown in FIG. 5.

Figure 6:
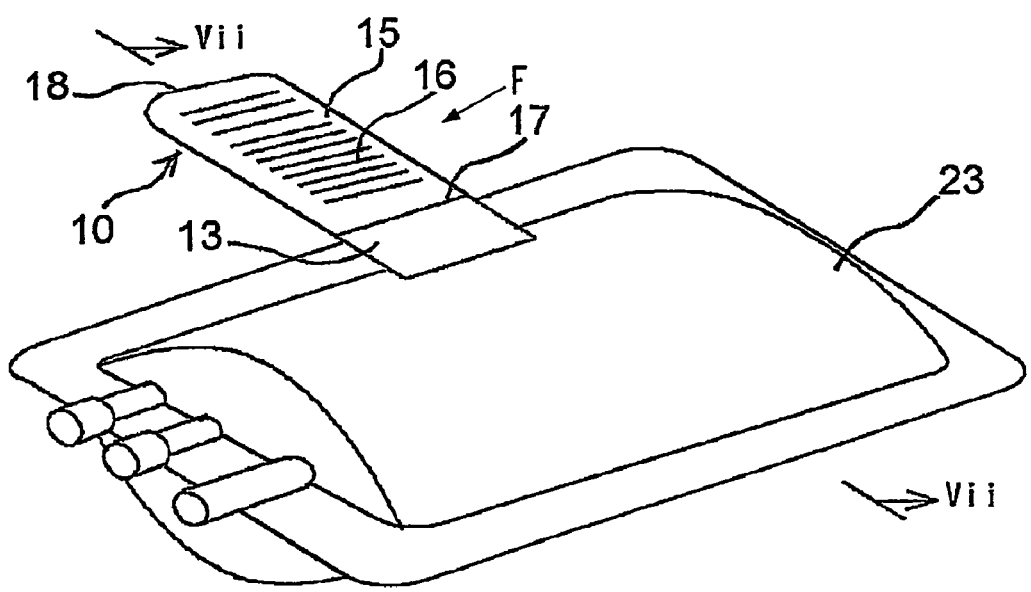
FIG. 6 is an explanatory diagram showing another pasting method for the RFID label shown in FIG. 1.
Figure 7:
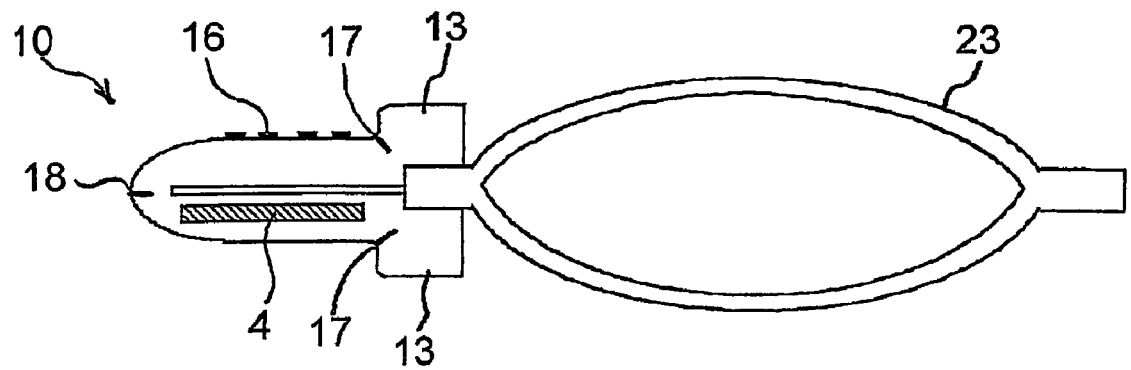
FIG. 7 is a sectional view along the direction of the arrow line VII-VII in FIG. 6.

Next, other pasting methods will be described with reference to FIGS. 6 through 9. FIG. 6 is a diagram showing how the label is pasted so that the two open pasting parts 13 of the RFID label 10 are caused to straddle the edge of the blood bag 23. FIG. 7 is a sectional view along the direction of the arrow line VII-VII in FIG. 6. The same effects as those described above are also obtained in the present embodiment; in particular, however, if this configuration is used, the respective RFID labels 10 can be can be caused to protrude outward from between the blood bags even in cases where the blood bags 23 are suspended or stacked. In this case, if the labels are pasted in slightly shifted positions along the edges of the blood bags 23, the RFID labels 10 can be accommodated in a space-saving manner along with the blood bags 23, and communications can be securely performed with the IC tags 4 of the respective RFID labels 10.

Figure 8:
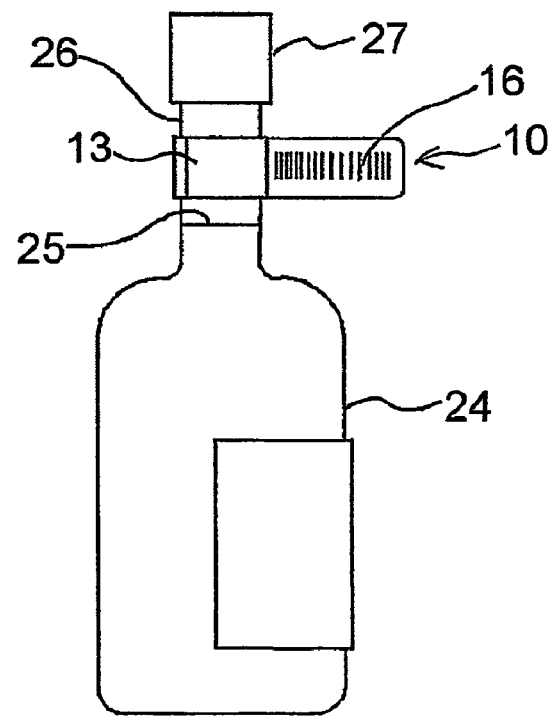
FIG. 8 is an explanatory diagram of a pasting method for the RFID label in cases where the object of pasting is a bottle containing a liquid.

FIG. 8 shows still another embodiment, which is characterized in that the pasting parts 13 of the RFID label 10 are pasted, or wrapped and pasted to the slender neck part 26 of a bottle 24 filled with a liquid in a position above the liquid level 25 in this bottle. The bottle 24 may be a glass bottle, or may be a ceramic/porcelain, metal or PET bottle or the like. Furthermore, the liquid may be a test sample, reagent or the like, or may be a sauce, liquor or the like. If the abovementioned configuration is used, the RFID label does not interfere with the accommodation of the bottle 24, and there is no absorption of electromagnetic waves by the liquid. Furthermore, even if the cap (cover or stopper) 27 of the bottle is made of a metal or the like, since the RFID label 10 is disposed separately from this, reading and writing of the IC tag 4 can be securely performed.

FIG. 9 shows still another embodiment; this figure shows how the pasting parts 13 are pasted in a straddling manner so as to rise from one edge of a metal can or a box-shaped container 28 accommodating a substance that contains a large amount of moisture (e. g., clay, meat, a gel or the like). Substantially the same effects and merits as those of the abovementioned embodiment can also be obtained by means of the above construction.

Next, FIGS. 10 through 13 show other embodiments regarding the shape of the bent parts of the RFID label 10. In all cases, the RFID labels 10 consist of a plurality of connected labels; however, only two units are shown in the Figures. In the following description, (A) in each Figure is front view, and (B) is a sectional view in the direction of the arrow lines B-B in the respective front views (A).

FIG. 10 shows an example in which the folding lines or bent parts 17 and 18 of the RFID label 10 are formed by perforations, the boundaries between the respective RFID labels 10 in the peeling paper 19 are formed by perforated cutting lines or slits 22, and the boundaries between parts of the label substrate 11 are formed by slits or perforated cutting lines, or both the peeling paper 19 and the label substrate 11 use perforated cutting lines. Specifically, the boundaries between the respective RFID labels 10 are formed by perforations in either the peeling paper 19 or label substrate 11, or both. Furthermore, a "scissors" symbol 29 for cutting is printed in the vicinity of these cutting lines 22.

In regard to the bent parts 17 and 18 of the label substrate 11 of the RFID label 10, FIG. 11 is similar to FIG. 10; in this example, however, perforations or slits 30 are formed in the peeling paper 19 coinciding with or in close proximity to the positions of the abovementioned bent part 17 (or 18). In this case, following cutting into respective units of the RFID label 10, the bending or folding of the label substrate 11 at the bent parts 17 or 18 can easily be performed with the peeling paper 19 temporarily attached "as is"; accordingly, the convenience of handling during the attachment work is greatly improved.

Figure 13A:
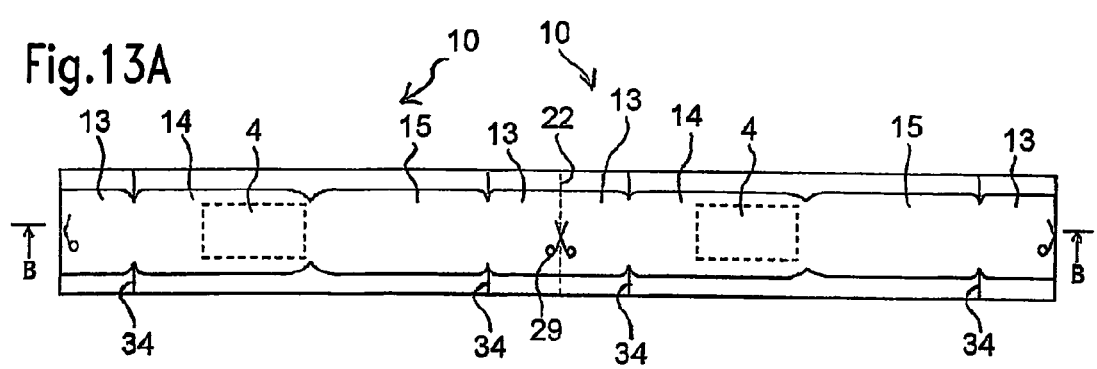
FIG. 13A is a plan view and FIG. 13B is a sectional view alone the line B-B.
Figure 13B:
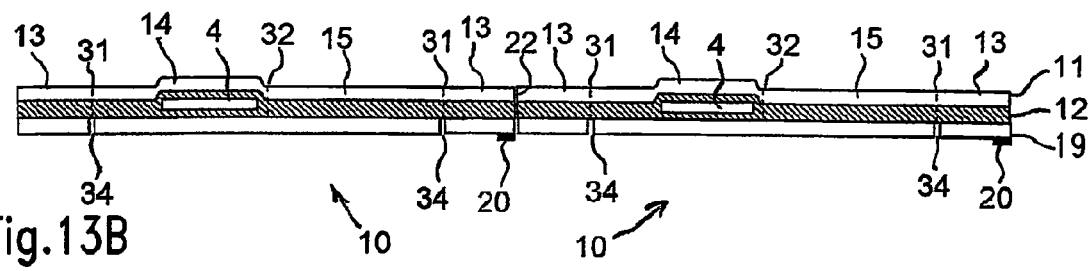

FIG. 12 shows another embodiment which is characterized in that the bent parts 31 and 32 of the label substrate 11 of the RFID label 10 are constructed not by perforations, but rather by narrow-width parts formed by local narrow working of the width of the label substrate 11. FIG. 13 shows an example in which perforations or slits 34 are formed in the peeling paper 19 coinciding with or in close proximity to the position of the abovementioned bent part 31 (or 32) for a label substrate 11 that has been subjected to the same working as in FIG. 12.

If the bent parts are formed by perforations formed in the label substrate 11 or narrow-width parts formed by partial narrow working of the width of the label substrate as in the respective examples described above, the locations where bending is performed are easily ascertained, so that the label substrate 11 can be easily bent or folded and pasted together without any deviation.

Furthermore, if the abovementioned bent parts are constructed by bending lines printed on the label substrate or narrow-width parts formed by partial narrow working of the width of the label substrate, the danger of erroneous cutting of the label substrate can be avoided.

Furthermore, if perforations or slits are formed in the peeling paper 19 coinciding with or in close proximity to at least one of the bent parts of the label substrate 11, then the label substrate can be bent or folded along easily bent portions of the peeling paper, so that the danger of mistaking the position where the label substrate is to be folded back and pasted together can be reduced, and at the same time, the danger of erroneous cutting of the label substrate can be avoided. Furthermore, if peeling paper parts separated by slits in the back surface are temporarily attached when the respective portions of the label substrate 11 are cut apart and pasted together, the convenience of the work can be greatly improved.

Figure 14:
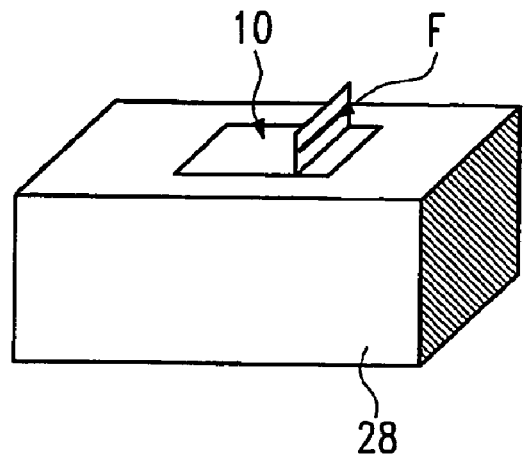
FIG. 14 shows an overall view of an object provided with a label according to the invention affixed to the object.

FIG. 14 shows a box 28 provided with another embodiment of the label 10 according to the invention.

Figure 15:
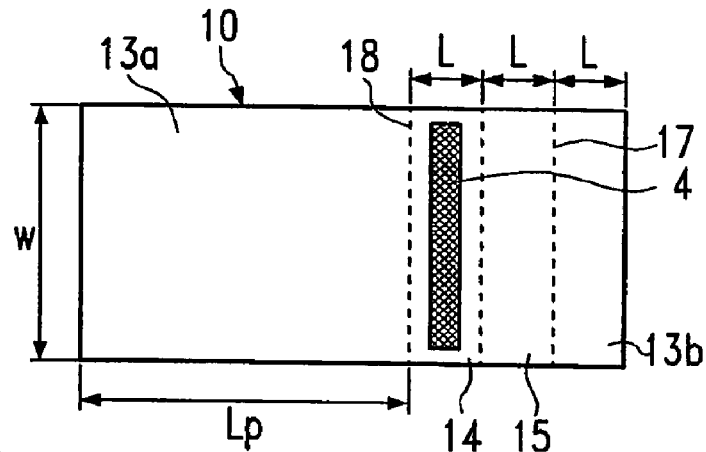
FIG. 15 shows a label according to FIG. 14 provided with the RFID tag in an unfolded manner.
Figure 16:
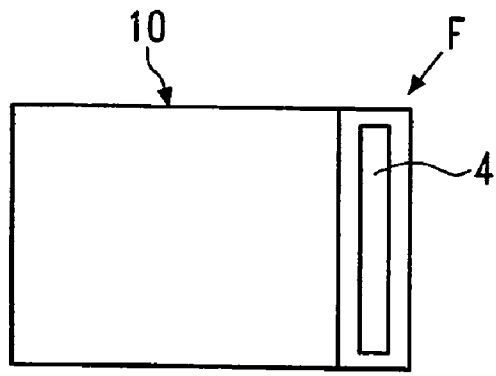
FIG. 16 shows the label of FIG. 14 in a manner ready to be applied to the object.

The label 10 according to FIG. 14 is preferably made of a label substrate 11, such as paper or a plastic foil. Usually, the label is translucent. When using the plastic foil, it might also be transparent. As illustrated in FIG. 15, the label is provided with a self-adhesive layer of adhesive agent 12 applied on one side thereof. Also, the label is divided into a pasting part 13, an IC tag holding part 14, a stroke part which serves as the printing recording pasting part 13. The pasting part 13, holding part 14 and stroke part or printing recording part 15 are respectively separated by folding lines 17,18. The folding lines 17,18 may be constituted by decreased thickness of the label or perforation lines. Even though it is preferred to provide folding lines, such folding lines are not necessary.

Figure 17:
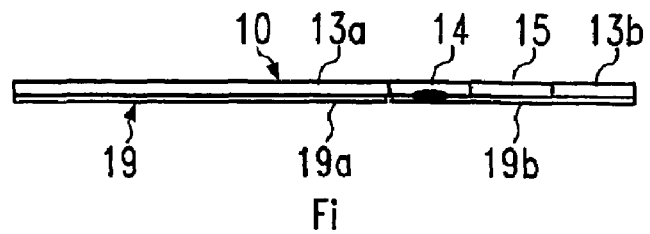
FIG. 17 shows a side view of another embodiment of a label according to FIG. 14.

The self-adhesive layer of adhesive agent 12 is preferably provided with a backing liner of peeling paper 19. In the embodiment in FIG. 17, the backing liner consists of two backing liner sections 19a and 19b. Backing liner section 19a covers the pasting section 13 and backing liner section 19b, the holding part and stroke part.

The adhesive layer extends over the first and second pasting parts, the holding part and the stroke part. Of course, it is also possible to selectively apply the adhesive layer only to the first and second pasting parts and the holding part. On the side of the label comprising the adhesive layer, there is also applied an electronic device which consists of an RFID tag 4 comprising an antenna 2 connected to an integrated circuit 1 including a receiver, a transmitter, and preferably also a microprocessor 7. A memory, which could be part of the microprocessor, is also connected to the antenna. The memory is provided for storing data related to the object to be identified.

As is further illustrated in FIG. 15, the RFID tag 4 is applied to the holding part 14 which is a field of the label which is along and off-set of the stroke part or stroke 15. The stroke part 15 has a surface which is at least equal to the surface covered by the tag. In the preferred embodiment, the dimensions of the stroke part are larger than the dimensions of the tag. On the other hand, the dimensions of the stroke part are about identical to the dimensions of the holding part 14. The dimensions of the second holding part 14 are about identical to the dimensions of the stroke part 15. Thus, the second pasting part 19, the holding part 14 and the stroke part 15 all have about a same length L. Said length L is about five times smaller than a length LP of the first pasting part 13. A width W of the first and second pasting parts, the holding part and the stroke part is identical, as the label is made from a single cut-off material.

Due to the dimensions of the holding part and the stroke part, it is possible to fold-over the stroke part over the holding part, such that the RFID tag 4 which is applied to the holding part is arranged between the holding part and the stroke part. Due to the adhesive material provided at least on the holding part, a folded-over holding part and stroke part form a flap F which forms a protrusion in the manner as depicted in FIG. 1. Due to the adhesive layer of the holding part, the stroke part and the holding part are rigidly connected.

The label according to the invention can be applied to the object in the following manner. After removing the backing liner 19, an operator may apply the RFID tag to the holding part. Due to the adhesive material on the holding part, the RFID tag will be attached to the holding part 14. In a next step, the operator will fold-over the stroke part 15 such that the stroke part covers the holding part 14 and thus, the holding part and the stroke part are connected with the RFID tag 5 located in-between. The holding part 14 and the stroke part 15 form the flap F. The label can now be applied to the object in the manner shown in FIG. 1. When applied, the flap F forms a freely extending protrusion with respect to the volume of the object whereby the flap is pivotably connected to the pasting part 13a and also to the second pasting part 13b. The flap F can be pivoted at about 180° such that the holding part or the stroke part may abut against the respective pasting sections. Particularly when handling large objects, the flap F can be moved manually by an operator in order to improve reading of the stored data on the RFID tag.

In embodiments where the backing liner 19 is separated into backing liner sections 19a and 19b, it might be possible to first remove the backing liner 19a and thus only attaching the pasting part 13a to the object and then folding-over the remaining part of the label and removing the second backing liner section 19b and applying the RFID tag to the label. In a second step, the stroke part may be folded-over the holding part as previously described and the remaining second pasting part 13b may be attached to the object.

Figure 18:
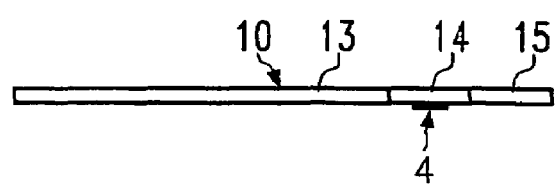
FIG. 18 shows another embodiment of a label according to the invention.

There are also embodiments possible where there is no second pasting part 13b as shown in FIG. 18. This embodiment corresponds to the embodiment of FIG. 14 except for the missing pasting part 13b. As an alternative, it may also be possible to provide a third backing liner section which only covers a second pasting part 13b, thus also allowing for improved handling. This third backing liner section may be removed from the second pasting part after the holding part and the stroke part have been folded-over.

Figure 19:
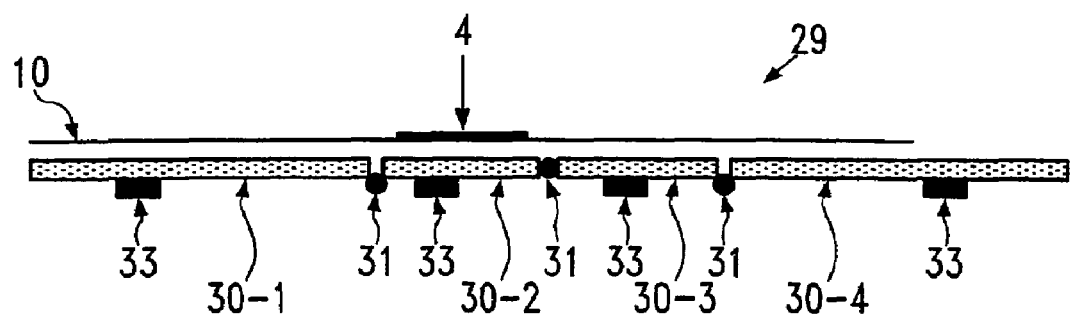
FIG. 19 shows a schematic sectional view of a device for applying a label according to the invention in a first position.
Figure 20:
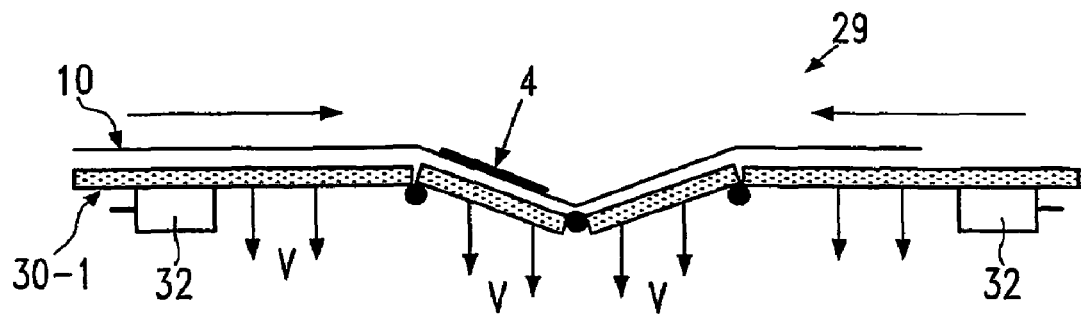
FIG. 20 shows the device of FIG. 19 during operation from a first position into a second position.
Figure 21:
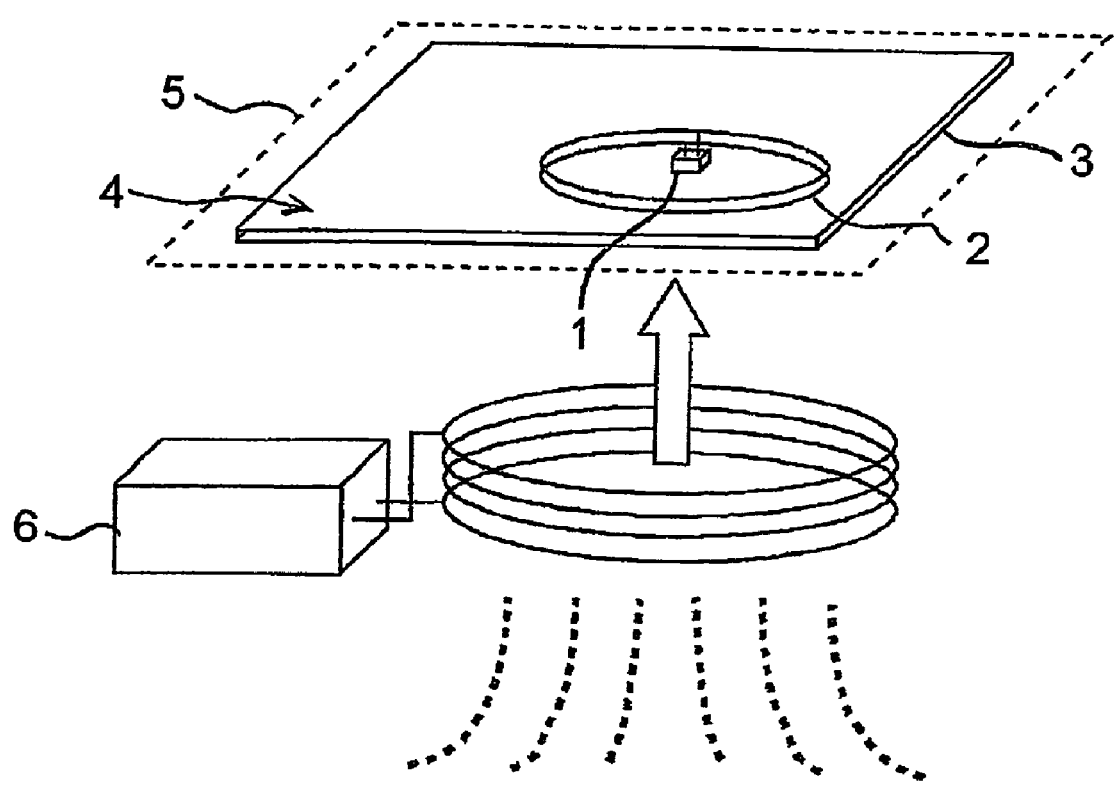
FIG. 21 schematically shows the operating principle of the technique disclosed therein.

The invention also relates to a device for applying the label according to the invention to an object. The device 29 is shown schematically in FIGS. 19 and 20. In order to apply the label with the RFID tag to the object, the label 10 is moved over a plate 30 as shown in FIG. 19 which consists of a plurality, for example four movable supporting elements or supporting plates 30-1, 30-2, 30-3 and 30-4. In a first position as depicted in FIG. 19, the surfaces of the supporting plates form a single plane to which the label abuts with the side opposite to the adhesive layer and the RFID tag. The successive parts of the supporting plates are mounted together with hinges 31 in order to pivot among each other. Also, the two outer supporting plates 30-1 and 30-4 are arranged such that they are slidably mounted essentially parallel to the plane of their surface. In FIG. 19, this movement would be horizontally as shown in FIG. 20.

The supporting plates are provided with perforations on which a vacuum is applied by a vacuum device 33. In such a manner, the label is sucked towards the plate 30 or the plate elements. In order to provide a smooth surface and sufficient durability, the plate elements may preferably be made of steel since this enables a smooth surface over which the label can be transported. The surface of the holding plates may also be provided with a coating in order to apply a smooth sliding movement of the tags. A movement of the plates is induced by operating members such as pneumatic cylinders 32. Of course, other operating members might be possible. As depicted in FIG. 20, the pneumatic cylinders 32 induce a translatory movement of the two outer plate elements 30-1 and 30-4, thereby pivoting the two inner plate elements 30-2 and 30-3. As the label is sucked to the plate elements, the label will be bent in the area of the hinges 31 and as shown in FIG. 20. Further translatory movement of the two outer plates 30-1 and 30-4 will eventually bring the holding part and the stroke part together and will press them towards each other, such that the holding part and the stroke part are connected. In a further step, the object can be put on the device in order to have the first and second pasting parts being attached to the object. Also, for large objects, the device may be moved such that the first and second pasting parts with the adhesive layer abut an object thereby attaching the label to the object.

The label according to the invention can of course be provided with a print, for example on the pasting parts and/or holding part and/or the stroke part. The Examples depicted in the Figures are shown without print. The label according to the invention allows a very easy way of improving handling of objects using RFID tags. It also allows a very simple and reliable method of applying the label to an object and also use a reliable and simple device in order to attach the label according to the invention to an object. The label may be attached manually and also allows automated application to objects.

What is claimed is:

1. A label comprising at least one pasting part with an adhesive agent for pasting the label to an object and comprising a holding part for holding an electronic device, for a radio frequency identification (RFID), said pasting part being foldable with respect to the holding part to allow said holding part to protrude from said object if said pasting part is pasted to said object, wherein said label further comprises a stroke part being foldable with respect to the holding part and the radio frequency identification (RFID) being arranged between the stroke part and the holding part.

2. Label according to claim 1, wherein said holding part is pivotably connected to said pasting part.

3. Label according to claim 1 wherein said holding part comprises an adhesive layer comprising an adhesive agent for attaching said electronic device to the label.

4. Label according to claim 1, wherein said label comprises a second pasting part and said holding part is arranged between the first and second pasting part.

5. Label according to claim 4, wherein-the stroke part is arranged between the holding part and the first or second pasting part.

6. Label according to claim 4, wherein the first and second pasting parts are arranged adjacent to each other when pasting the label to the object.

7. Label according to claim 1, wherein the stroke part forms a printing recording part.

8. Label according to claim 7, wherein said printing recording part has an identification code.

9. Label according to claim 1, wherein the stroke part is foldable over the holding part and electronic device such that the electronic device is located between the holding part and the stroke part and in order to form a flap which is pivotably connected to said first and second pasting parts.

10. Label according to claim 1, wherein the dimension of the stroke part corresponds essentially to the dimension of the holding part.

11. Label according to claim 1, wherein the dimension of the electronic device is smaller than the holding part.

12. Label according to claim 1, wherein the label comprises at least a printed folding line between the stroke part and the holding part and/or the holding part and the pasting part.

13. Label according to claim 12, wherein the folding line is formed by perforations or at least one slit.

14. Label according to claim 12, wherein the folding line is formed by a reduced width of the label.

15. Label according to claim 12, wherein the holding part is separably connected to the pasting part by the folding line.

16. Label according to claim 12, wherein the folding line is formed by a reduced cross-section of the label.

17. Label according to claim 1, wherein a backing layer comprising a peeling paper is provided to the adhesive layer of the label.

18. Label according to claim 17, wherein the backing layer is provided with perforations or slits along the folding line.

19. Label according to claim 17, wherein the backing layer is comprised of at least two backing layer sections of which one corresponds to the holding part.

20. Label according to claim 1, wherein the label comprises a flexible material, preferably paper.

21. Label according to claim 1, wherein the label comprises a flexible textile material.

22. Label according to claim 1, wherein the label comprises a flexible plastic material, preferably a thermoplastic material.

23. Label according to claim 1, wherein at least the pasting part and the holding part are made from the same material.

24. Label according to claim 1, wherein at least the pasting part is opaque to light in the visible spectrum.

25. Label according to claim 1, wherein the holding part is separably connected to the pasting part.

26. An object provided with a label according to claim 1, wherein the pasting part, preferably two pasting parts are attached to the object.

27. Object according to claim 26, wherein the stroke part and the holding part form a flap which is pivotably connected to the pasting part or the pasting parts.

28. Object according to claim 26 wherein the object is a flexible container.

29. Object according to claim 26, wherein the label is attached to a corner of the object, such that the pasting parts are located to either sides of the corner.

30. Object according to claim 26, wherein the object has an at least partially cylindrical section to which the label is attached.

31. Object according to claim 30, wherein the object is a bottle.

32. Object according to claim 31, wherein the label is attached to the neck portion of the bottle.

33. A method for applying a label according to claim 1, wherein by folding the pasting part with respect to the holding part and pasting the pasting part to the object such that the holding part protrudes from the object.

34. Method according to claim 33, wherein by folding the holding part and the stroke part towards each other before applying the label to the object, then applying the pasting part or the pasting parts to the object.

35. A device for applying a label according to claim 1, wherein comprising a folding mechanism in order to fold the holding parts towards the stroke part.

36. Device according to claim 35, wherein it comprises movable first support elements which abut to the holding part and the stroke part, at least prior to folding the holding part towards the stroke part and at least one second support element which abuts the pasting part or the pasting parts.

37. Device according to claim 36, wherein the second supporting elements are movable along the length of the pasting part.

38. Device according to claim 35, wherein the supporting elements comprise supporting plates for abutment of the pasting part and/or the holding part and/or the stroke part, respectively.

39. Device according to claim 38, wherein the supporting plates comprise perforations to which a vacuum is applied by a vacuum device in order to suck the respective pasting part, holding part or stroke part to the supporting plates.

40. Device according to claim 38, wherein the supporting plates are connected by joints.

41. Device according to claim 35, wherein the supporting plates are movable from a flat position in which their surfaces form essentially a plane for abutment of the label into a second position, in which the surfaces of the first supporting plates are essentially facing each other.

* * * * *